United States Patent [19]

Sherman

[11] Patent Number: 5,669,509

[45] Date of Patent: Sep. 23, 1997

[54] DRY SEPARATION OF FINE POWDER FROM COARSE CONTAMINANT IN A VIBRATING FLUID BED

[75] Inventor: Larry G. Sherman, Edmond, Okla.

[73] Assignee: Kerr-McGee Chemical Corporation, Oklahoma City, Okla.

[21] Appl. No.: 608,349

[22] Filed: Feb. 28, 1996

[51] Int. Cl.$^6$ .................................................. B07B 4/00
[52] U.S. Cl. .................................................. 209/2; 209/474
[58] Field of Search ................................. 209/466, 468, 209/471, 437, 475, 474, 2, 40, 467

[56] References Cited

U.S. PATENT DOCUMENTS

| | | | |
|---|---|---|---|
| 2,903,132 | 9/1959 | Berry | 209/475 X |
| 4,546,552 | 10/1985 | Cahn et al. | 209/40 X |
| 4,741,443 | 5/1988 | Hanrot et al. | 209/467 X |
| 5,047,387 | 9/1991 | Talmy et al. | 209/2 X |
| 5,299,694 | 4/1994 | Rambaud | 209/474 X |

FOREIGN PATENT DOCUMENTS

| | | | |
|---|---|---|---|
| 532388 | 9/1929 | Germany | 209/475 |
| 607286 | 9/1932 | Germany | 209/475 |
| 628060 | 3/1936 | Germany | 209/475 |

*Primary Examiner*—D. Glenn Dayoan
*Attorney, Agent, or Firm*—Herbert M. Hanegan; J. Rodgers Lunsford, III

[57] ABSTRACT

A method for separating coarse particles from TiO$_2$ powder in a fine powder composition by the steps of: providing a system in which a source of the fine powder composition communicates with a minimally fluidizable bed of the fine powder composition within the system; delivering the fine powder composition from the source to the bed; imparting energy into the bed and delivering a fluidizing gas to the bed at a rate to cause the TiO$_2$ powder and coarse particles of the fine powder composition to separate into a TiO$_2$ powder phase and a coarse particle phase; removing the TiO$_2$ powder from the system; and removing the coarse particles from the system.

8 Claims, 1 Drawing Sheet

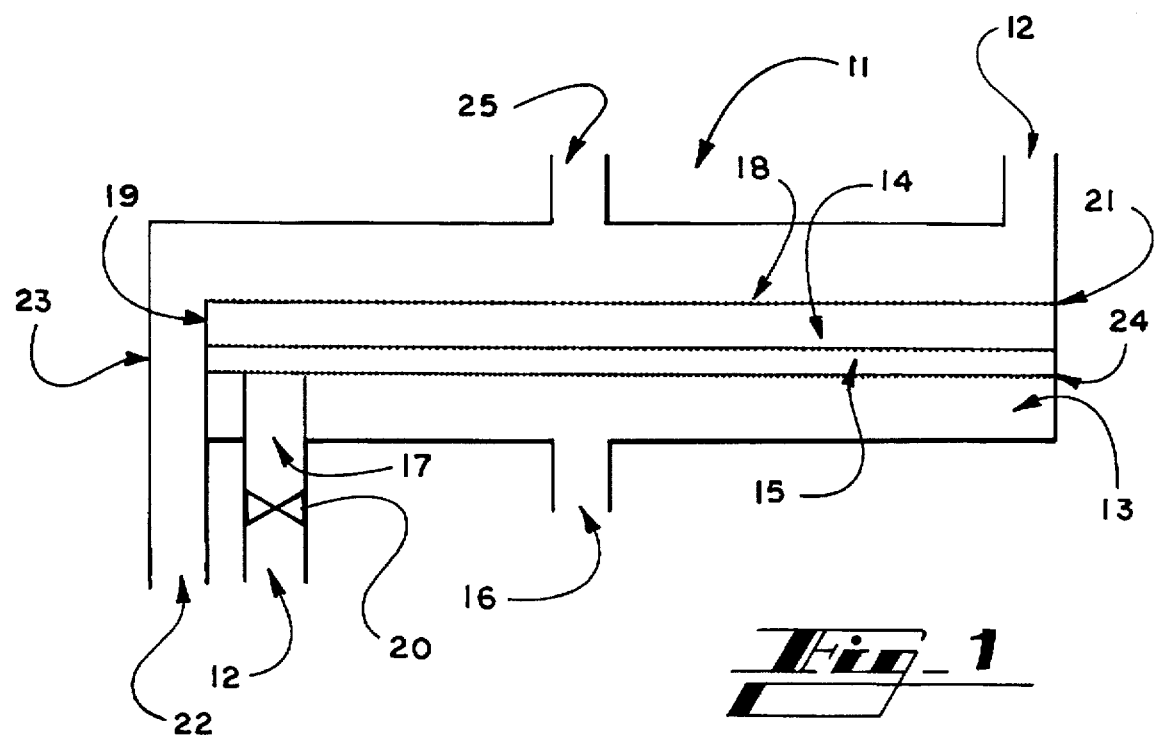
*Fig_1*
*Fig_2*

DRY SEPARATION OF FINE POWDER FROM COARSE CONTAMINANT IN A VIBRATING FLUID BED

FIELD OF THE INVENTION

The present invention relates to fluidization methods and apparatus for separating compositions comprised of particles having different densities, and more particularly a method that classifies or separates fine titanium dioxide end products from less desirable coarse particulate contaminants.

BACKGROUND OF THE INVENTION

In the manufacture of pigmentary titanium dioxide by the vapor phase oxidation of titanium tetrachloride, coarse particles are commonly introduced into the oxidation reactor or into a cooler following the reactor, as is described in British Patent Specifications Nos. 1,049,282, 1,069,071, and 1,092,883. The coarse particles may be introduced for several reasons. The coarse particles may be introduced into the reactor in order to reduce or prevent the deposition of product titanium dioxide onto the reactor surface, or they may be introduced into the cooler to quench the reaction products or to prevent or reduce the deposition of pigmentary titanium dioxide on the surfaces of the cooler. In each case, the pigmentary titanium dioxide must subsequently be separated from the coarse particulate material.

It is well known to utilize fluidized beds for cleaning, classifying, or other processing of particulate materials. Fluidized beds often include a perforated horizontal plate through which a fluidizing medium, such as air, flows upwardly to fluidize particulate material supported on the plate. Particles of higher specific gravities tend to sink to the bottom of the bed while particles of lower specific gravity float to the top of the bed. The lighter particles rise to an elevation at which they can be elutriated or recovered by means of a larger diameter cylindrical disengaging zone, down covered tubes, and other apparatus. The separations obtained in such simple apparatus depend generally upon gross differences in particle size, shape, and density. Fluidized bed devices designed to classify materials by fluidization potential are disclosed, for instance, by Matheson, U.S. Pat. No. 2,683,685; Greenwood, U.S. Pat. No. 3,825,116; Barari, et al., U.S. Pat. No. 4,589,981; and Belk, U.S. Pat. No. 4,857,173. Fluidized bed devices suffer from a common general problem: they generally fail to overcome the aggregative properties of fine powders, thereby frustrating attempts to classify fine powders by gaseous fluidization. Because pigmentary titanium dioxide is a fine powder, its aggregative properties in the past frustrated attempts to separate it from coarse particles by gaseous fluidization.

The problems associated with handling and classifying fine powders such as pigmentary titanium dioxide are well known. Fine powders are known to drop to the base of fluidized beds, readily pack, and to behave as aggregates and not as individual particles. Consequently, in a fluidized bed fine powders bridge across openings and refuse to flow. The angle of repose of fine powders can equal or exceed 90 degrees. Attempts to fluidize such materials with gas are thus doomed to failure. Gas flow can totally bypass a bed of powder, a phenomenon commonly known as "rat holing." Solid bridges can form in small diameter powder beds. These bridges are usually unstable and periodically collapse according to recognized slip/stick flow phenomena. Further consideration of the aggregative behavior of fine particles in fluid beds is given, for example, in *Powder Technology*, 6 (1972), pp 201–215. These aggregative properties frustrate attempts to classify fine powder compositions by gaseous fluidization and problems have not been adequately considered or resolved by gaseous fluidization and elutriation devices known in the prior art.

In addition to aggregative problems further problems arise during dry classification of titanium dioxide particles due to the formation of what are commonly termed "prills." There is a tremendous affinity among titanium dioxide particles in gaseous media. This particle affinity causes titanium dioxide particles to readily adhere to one another in gaseous media, and create larger, undesirable particles that frustrate effective classification. The affinity among particles increases as their level of internal energy is raised through such action as gaseous fluidization. Thus, prill formation is increased at higher fluidizing velocities. Longer classification times also result in greater prill formation due simply to the increased opportunity time for the particles to collide, adhere and form prills.

The primary commercial approach to classifying fine powder compositions, or more specifically to separating relatively coarse particles from fines within the fine powder composition, especially in the titanium dioxide pigment industry, therefore, involves wet processing. Wet processing comprises first mixing the powder composition with water to form a slurry. Once a mixture of coarse and fine particles has been slurried in water a variety of separation options are available based upon gravity, density and size of particles. Such separation methods include, without limitation, sedimentation, wet screening, hydrocloning, and filtration. Although these approaches are individually rather simple, one is forced to handle large volumes of dilute slurry, which can lead to large volumes of waste water. Ultimately, one must still produce a dry fine powder of the desired particle size.

Claridge, et al., British Patent Specification No. 1,098,881, disclose an improved gaseous fluidization device wherein the fluidization column supports two layered phases of fluidized particles, the lower phase a coarse particulate dense phase, the upper phase a fine powder light phase. The device disclosed by Claridge et al. is capable of separating coarse particles with a typical size range of from 500 to 2,000 microns, from titanium dioxide pigment having a typical size range of from 5 to 20 microns. The device disclosed by Claridge et al. suffers from its inability to separate coarse particles that are smaller than 500 to 2,000 microns from pigmentary titanium dioxide. Coarse particulates in a size range of from 50 to 700 microns are often employed today in the manufacture of titanium dioxide pigment. Moreover, product purity specifications typically dictate that virtually all particulate impurities be removed from the finished product.

Dry classification devices other than fluidized bed apparatus are disclosed by, for instance, Kanda, et al., U.S. Pat. No. 4,802,977 (inertial separation); Masuda, U.S. Pat. No. 4,545,897 (mechanical separation by size); Schurr, et al., U.S. Pat. No. 4,083,946 (injection of powder into gas traveling at supersonic velocity); and Gebauer, U.S. Pat. No. 3,441,131 (zigzag classification). Each of the foregoing references suffers from its failure to adequately compensate for the aggregative properties of fine powders, which frequently clog or stick to the mechanical apparatus. Schurr, et al., U.S. Pat. No. 4,083,946 is directed towards removing chloride contaminants from $TiO_2$ powders, and does not teach removal of coarse particulates from $TiO_2$ powders.

A need thus exists in the fine powder processing industry for a dry process to readily and effectively remove coarse contaminants from fine powders in fine powder compositions.

SUMMARY OF THE INVENTION

The present invention is a novel solution for classifying fine powders incorporating gaseous fluidization principles. Using the present novel solution a fluid bed classifier can be operated to overcome the foregoing gaseous fluidization limitations, and effectively separate fine powders from coarse contaminants. The process of this invention provides that initially a fine powder composition containing coarse particles is introduced to a shallow bed of the same or similar fine powder and coarse particles in which the fine powder is minimally fluidized by a fluidizing gas introduced beneath the bed. Secondly, a means to impart energy is provided, which breaks up aggregated fine powder that might otherwise frustrate the fluidization thereof, and causes refluidization of the fine powder. It has been surprisingly found that vibration in conjunction with minimal gaseous fluidization of the fine powder overcomes the aggregative properties inherent to fine powders. The coarse particles settle to the base of the bed for collection and separation from the fine powders.

By operating a classifier within appropriate operational parameters the fine particulates within a fine powder composition can thus be separated from coarse, undesirable contaminants, while the coarse contaminants are concurrently withdrawn from the fluidization bed by any known withdrawing means. The invention can thus be operated on either a batch or continuous basis.

BRIEF DESCRIPTION OF THE DRAWINGS

FIG. 1 represents a fluidizing device that can be used to carry out the process of this invention.

FIG. 2 represents a second fluidizing device that can be used to carry out the process of this invention.

DESCRIPTION OF THE PREFERRED EMBODIMENTS

The present invention applies fluidization principles to separate fine powders from coarse contaminating particles by fluidization potential. The invention has particular application, and has proven especially advantageous, to separate coarse particles from fine pigmentary titanium dioxide. Although various devices may be employed to carry out this novel process, the invention is preferably practiced in the apparatus illustrated in FIG. 1. FIG. 1 depicts a vibrating fluid bed unit (11) configured generally as an elongated hollow vessel. The general cross-sectional shape and configuration is not generally critical to the practice of the invention, provided the base of the cross-sectional area is flat and horizontal. A vibrating gas distributor (13) is located at the base of the unit into which unprocessed pigment to be classified is charged through charge point (12). A perforated plate (24) is formed on the upper side of the vibrating gas distributor (13). The fine powder upon charge to the unit (11), forms a bed of powder (18) supported by the vibrating gas distributor (13). Gas is introduced to the unit through aperture (16), whereupon the gas flows through the perforated plate (24) and the bed (18) to minimally fluidize the bed of fine powder (18). As the bed of free powder is minimally fluidized it is also vibrated in such a fashion that aggregated pigment is broken up. The vibrational energy can also be applied in such a fashion to cause the powder to travel through and to the end of the vessel. The powder is thereby subjected to concurrent gaseous fluidization and vibration during its traversal along the length of the vessel. By these concurrent actions the powder rises above the coarse contaminating particles, and is readily separated from the coarse particles at the end of the processing vessel.

As discussed previously fine powders, and especially pigments, present unique processing and handling difficulties. Using prior art processes and apparatus, gas supplied beneath fine powder does not cause all the powder to disaggregate and fluidize. Rather, rat-holes and bridges form that allow the fluidized gas to by-pass the powder. According to the process of this invention, energy is imparted to disaggregate the aggregated fine powders. Once the fine powder has disaggregated, the flow of fluidizing gas through the bed of coarse particles and fine powder then causes the fine powder to fluidize and join the non-aggregated, fluidized powder, whereupon the fine powder can be recovered.

As stated, the fluidization of the powder is preferably practiced under minimal conditions. Operating at minimally fluidizing conditions serves at least two important functions: (1) because the rate of prill formation increases along with the fluidization velocity, operating within minimally fluidizing parameters reduces the rate of prill formation; and (2) because smaller coarse particles are more readily fluidized than larger coarse particles, operating under minimally fluidizing conditions causes fewer and smaller coarse particles to fluidize, thereby improving one's ability to separate smaller coarse particles from fine powders than was heretofore possible by application of prior art gaseous fluidization processes, and further providing a greater total separation between the fine powder and the coarse particles. In operation, fluidization will preferably be conducted such that the fine powder layer of the bed merely bubbles under the action of the minimally fluidizing gaseous flow.

In its preferred embodiment the vibrational energy is applied to the bed in an oscillating mode to cause the bed to continuously migrate from the point where it is introduced to the unit, to the second end of the unit where the fine powder can be physically separated from the coarse particles. The speed with which the bed migrates can be varied by adjustment to the vibration angle, stroke, and frequency of the vibrating mechanism. Suitable vibrating mechanisms are well known in the art. Manufacturers of vibratory conveyors include, for instance, Carrier Vibrating Equipment, Inc.

Application of vibrational energy to cause the powder to migrate serves several important functions. For instance, the distance of travel, or the time of travel, each influence the degree to which the fine powder and coarse particles separate into two distinct phases. By manipulating the distance of travel, or the time of travel, obtaining the maximum separation into phases of the fine powder and the coarse particles is possible before the fine powder is physically separated and drawn from the unit.

The migration of the powder also assists the physical separation of the fine powder from the coarse particles. In a preferred embodiment the invention is practiced in a unit (11) such as shown in FIG. 1 that is equipped with an overflow weir (19) and valve assembly (20) for the selective physical separation of fine powder phase (14) from coarse particle phase (15). In operation the bed (18) is caused to migrate from end (21) to end (23) of the unit. At end (23) the bed is caused to bump up against an overflow weir (19). As the bed migrates from end (21) to end (23) it causes the upper fine powder phase (14) of the bed (18) to flow over the weir whereupon the fine powder is separated discharged through pipe (22) and captured by means not shown. The coarse particle phase, on the other hand, is withdrawn from the unit (11) through catchment duct (17) and valve assembly (20). The fluidizing gas may be withdrawn from unit (11) through aperture (25). By continuously withdrawing the bottom phase at the rate that the coarse particles are introduced to the unit one is able to continuously remove coarse particles from the bed, and continuously separate fine powder from coarse contaminating particles. If desired it is also possible to withdraw the coarse particles only periodically. Periodic withdrawal might be preferable, for instance, if the invention is practiced in a batchwise mode. Periodic withdrawal may also be preferable if the proportion of coarse particle to fine powder is not perfectly consistent throughout operation of the invention.

In a batchwise mode, a charge of the mixture is placed in the separator unit and gas flow and vibration operation carried out until the desired efficiency of separation had been achieved. The purified product and coarse contaminant layers are then withdrawn. Another charge is then fed to the separator unit and the process repeated. In a continuous mode of operation, raw feed may be added to a separator unit at a rate such that the desired efficiency of separation will be achieved. A slip stream may be continuously withdrawn near the base of the bed and screened or otherwise treated to recover the coarse contaminant.

While in the preferred embodiment of the invention oscillating vibrational energy is employed to disaggregate the fine powder, because such energy causes the powder to migrate in a predetermined fashion, energy can be imparted to the aggregated fine powder by other means, if in practicing the invention it is unnecessary or not possible to migrate the bed in a particular direction. For instance, if the bed is formed in a fluidizing column the bed of coarse particles can be mechanically shaken by a mechanical vibrator affixed to the exterior of the column, or a mechanical vibrator may be inserted directly into the bed of coarse particles within the column. Alternatively, sound waves or subsonic energy waves could be transmitted directly to the fine powder to impart energy thereto. Any of the foregoing types of energy is sufficient, if imparted correctly, to disaggregate the fine powder according to the process of the invention, and to cause separation of fine powder from coarse contaminating particles.

The fluidizing gas may be introduced into the vessel in any manner provided it passes through the bed of coarse particulate material and gives satisfactory fluidization of the fine powder. As previously discussed, the vessel is preferably provided with a perforated floor along its entire length through which the fluidizing gas is introduced. Generally, any gas inert to the fine powder composition may be employed as the gaseous medium. The term "inert gas" is used herein to mean a gas that, under the conditions prevailing within the separation vessel, is chemically inert with respect to the substances present in the vessel. In the case of titanium dioxide particles the term "inert gas" excludes halogens. The inert gas used in the classification of titanium dioxide pigments is preferably nitrogen.

The principal feature of powders that are capable of classification according to this invention is their potential to separate upon fluidization into fine powder and coarse particulate. The potential of the powder composition to separate in a fluidized bed is influenced by the relative fluidization potentials of the fine powder and the coarse contaminant, which is generally determined by three dependent factors—particle shape, size, and density. Of these three factors, particle size is generally the determinative characteristic. Because the process of the invention is preferably carried out under minimal fluidizing conditions, the process is capable of classifying particles having minimal difference in size.

Powder compositions advantageously classified according to the process of this invention contain a fine powder component comprising particles which behave as a single entity, which single entity component has an effective size ranging from about 0.1 to about 20 microns in diameter. The invention can advantageously be practiced on $TiO_2$ powder components having effective sizes ranging from about 0.5 to about 10 microns in diameter. The invention is most effective at separating $TiO_2$ components having effective sizes from about 2 to about 5 microns in diameter. The sizes refer to the titanium dioxide powder components or particles that behave as single entities within the fluidized bed, and not to the individual pigmentary particles of which they are comprised. The latter are typically from about 0.15 to about 0.2 microns in diameter.

The term "coarse particle" is used herein to describe a particulate material that, under the conditions prevailing within the vessel, is chemically inert with respect to any of the substances in the vessel, and has a particle density greater than the particle density of $TiO_2$. The coarse particles may consist of zircon particles, compacted $TiO_2$ particles, or silica sand. The coarse particles may be coated with pigmentary $TiO_2$. The coarse material may also consist of a mixture of more than one of these particulate materials. Advantageously the particle size range for the coarse particles is from about 50 to about 700 microns. The preferred size range for the diameters of the pigmentary titanium dioxide particles in the bed is from about 5 to about 20 microns. Thus, the difference in particle size and density between the two components is sufficiently great to allow control of the rate of introduction of the fluidizing gas to insure that only the pigmentary titanium dioxide is fluidized in the vessel. The coarse particles thereby settle to the bottom of the bed.

In general, the fine powder particles withdrawn from the second or upper fluidized layer in the bed may contain some coarse particulate material, and the coarse particulate withdrawn from the first or lower layer in the bed will contain some pigmentary titanium dioxide, in which case further separation may be desirable. Further separation may be accomplished by any known conventional means, including those methods discussed in the background section of this specification, or introduction to a second vibrating fluidization for additional processing according to the process of this invention. Coarse particles thus separated may advantageously be recycled, by reintroduction to the reactor and/or cooler from which the coarse particles were originally withdrawn.

In the following Examples the invention was practiced in a device similar to the apparatus illustrated in FIG. 2. FIG. 2 shows an upright hollow column (31) that constricts toward the base of the column in the shape of a cone (32). Within the column is positioned a vertically inclined tube (33) through which a fine powder composition stream (34), or raw feed, is supplied downwardly into the column. A bed of non-fluidized coarse contaminating particles (35) separated from the fine powder (36) is shown resting within the conical base of the column (32). In operation a fluidizing gas stream (37) is injected vertically upwards into the column through the base beneath the bed of non-fluidized particles (35), through the bed of non-fluidized particles, and into the powder composition or raw feed charge from the tube, concurrently with said charge. A portion of the powder composition or raw feed charge thereby rises to the top of the column with the gas flow, and overflows the rim of the column (31). The fluidizing gas is introduced to the column at such a rate that the coarse particles within the powder composition or raw feed are not fluidized, but rather drop into the bed of non-fluidized particles. The coarse particles are then periodically or continuously withdrawn from the bed by a withdrawing device (38) to prevent the volume of coarse particles from reaching a predetermined level.

EXAMPLE 1

A four-inch cylinder Pyrex glass tube was attached to a Pyrex glass funnel to serve as a separator vessel. There was no frit at the base of the cylinder. The cylinder was clamped in a ring stand and a vibrator having adjustable vibration amplitude was clamped to the ring stand. A nitrogen source was connected to the funnel and the gas flow was adjusted such that the open-tube superficial gas velocity was approximately 0.025 ft/sec. The vibrator was turned on and adjusted such that the amplitude was 80% of maximum.

The vessel was filled with a $TiO_2$ pigment which contained approximately 50% by weight of 30 mesh (100% greater than 700 microns) sand. The fluidization was initially non-uniform ("spouting"). The sand was visually seen to settle into the cone of the separator, where it served as a gas distributor. Once this occurred, smooth fluidization was observed. Unseparated raw $TiO_2$ pigment was fed into the center of the tube through a one-inch Pyrex glass standpipe which discharged approximately 1 inch below the surface of the bed. The feed rate was adjusted to approximately 3 lb/hr. Purified product cascaded over the edge of the funnel into a catch pan positioned below the funnel. The sand level in the cylinder was monitored visually. When the level of sand was about 1 inch below the rim of the cylinder, the separator was shut down and the nitrogen source disconnected from the base of the funnel. Byproduct sand was removed to reduce the level in the separator. The nitrogen source was then reconnected and separation operations were resumed.

After about 8 pounds of raw $TiO_2$ pigment had been separated, a sample of the purified product and byproduct sand were submitted for analysis. The purified pigment contained 1% sand. The byproduct was 89.5% sand and 10.5% $TiO_2$. Material balance calculations indicated that the separation removed 99% of the sand from the feed and that 88% of the $TiO_2$ was recovered as purified product.

EXAMPLE 2

Approximately 10 pounds of a different specification raw $TiO_2$ pigment was separated using the same procedure set forth in Example 1. Analysis of the feed showed 19.23% of 30 mesh sand. Analysis of the purified product showed it to be sand-free. The sand byproduct was assumed to be similar to that seen in Example 1. Material balance indicates 100% sand removal with 97% recovery of $TiO_2$ as purified product.

EXAMPLE 3

The procedure of Example 1 was used to conduct a separation of commercial raw $TiO_2$ pigment containing 1.5 wt % sand. The conical base of the separator was filled with 30-mesh coarse sand which served as a gas distributor. The 2.5"-long cylindrical body of the separator was filled with 146.7 gm. of raw $TiO_2$ pigment. Nitrogen was fed to the bed at a rate corresponding to 0.12 ft/sec superficial velocity, and the vibrator was adjusted to 55% of maximum. Raw pigment was fed to the system at 8.1 gm/min. 88.3% of the pigment fed was recovered as purified product containing 0.29 wt % sand. Consequently, 80.7% of the sand was removed.

A sample of the raw feed was washed to remove the pigment and isolate the sand for screen analysis. The sand from the feed was passed through a set of standard U.S. Screens to produce the following analysis:

| Mesh | Wt % on |
| --- | --- |
| +40 | 50.4 |
| +70 | 23.7 |
| +140 | 20.3 |
| +170 | 2.2 |
| +200 | 1.5 |
| +230 | 1.0 |
| +325 | 0.7 |
| Fines | 0.2 |

What is claimed is:

1. A method for separating coarse particles from $TiO_2$ powder in a fine powder composition comprising the steps of:

(a) providing a system wherein a source of said fine powder composition communicates with a minimally fluidizable bed of said fine powder composition within the system;

(b) delivering said fine powder composition from the source to said bed;

(c) continuously imparting energy into said bed to disaggregate the fine powder composition and delivering a concurrent flow of a fluidizing gas to said bed at a rate to cause the $TiO_2$ powder and coarse particles of the fine powder composition to separate into a $TiO_2$ powder phase and a concurrent coarse particle phase;

(d) removing the $TiO_2$ powders from the system; and (e) removing the coarse particles from the system.

2. The method of claim 1 wherein the energy in step (c) is imparted by vibratory means.

3. The method of claim 1 wherein the $TiO_2$ powder component of the fine powder composition comprises particles which behave as a single entity, which single entity has an effective size range of from about 0.1 to about 20 microns.

4. The method of claim 3 wherein the $TiO_2$ powder single entity effective size range is from about 0.5 to about 10 microns.

5. The method of claim 4 wherein the $TiO_2$ powder single entity effective size range is from about 2 to about 5 microns.

6. The method of claim 1 wherein the individual $TiO_2$ particles of the $TiO_2$ powder have a size range of from about 0.15 to about 0.2 microns.

7. The method of claim 1 wherein the coarse particles have a particle size of from about 50 to about 700 microns.

8. The method of claim 1 wherein the coarse particles are removed in step (e) at a rate such that the amount of coarse particles within the coarse particle phase is neither significantly depleted nor reduced in volume.

* * * * *